United States Patent [19]

Hase

[11] Patent Number: 4,471,423

[45] Date of Patent: Sep. 11, 1984

[54] MULTI-VOLTAGE DC OUTPUT WITH SINGLE REACTOR VOLTAGE CONTROL

[76] Inventor: Alfred M. Hase, 390 Tapscott Rd., Scarborough, Ontario, Canada

[21] Appl. No.: 349,186

[22] Filed: Feb. 17, 1982

[51] Int. Cl.³ .......................................... H02P 13/24
[52] U.S. Cl. ...................................... 363/90; 363/126
[58] Field of Search ............................... 363/22–26, 363/75–77, 90, 95, 125–130; 323/267

[56] References Cited

U.S. PATENT DOCUMENTS

| | | | |
|---|---|---|---|
| 3,601,680 | 8/1971 | Beckwith | 363/26 |
| 3,745,440 | 7/1973 | Lord | 363/17 |
| 3,916,286 | 10/1975 | Waehner | 363/25 |
| 4,042,872 | 8/1977 | McLeod | 363/23 |
| 4,142,141 | 2/1979 | Hase | 323/248 |

OTHER PUBLICATIONS

A. C. McPherson et al., "Microwave Power Rectification with Commercial Schottky Barrier Diodes", Journal of Microwave Power, 4(4), 1969, pp. 278–285.

Primary Examiner—Peter S. Wong
Attorney, Agent, or Firm—Donald E. Hewson

[57] ABSTRACT

A circuit having voltage regulated DC-output is provided, which may have balanced DC voltages with respect to zero, and which has only a single voltage sensing and power regulating means. The power regulator is on the input of a transformer having at least a bifilar wound secondary and a center tap. One or more pairs of balanced taps, one of each pair on either side of the center tap, are provided; and to each tap there is connected a pair of oppositely facing diodes, connected as to their polarity to provide positive or negative DC voltage with respect to zero; with similarily connected diodes from each pair of diodes at each tap being tied together at their output, facing the output of the circuit. In series with the output terminals of the circuit there are closely coupled, bifilar wound chokes, wound on a single core with isolated windings, and polarity connected to the respective outputs.

8 Claims, 3 Drawing Figures

4,471,423

MULTI-VOLTAGE DC OUTPUT WITH SINGLE REACTOR VOLTAGE CONTROL

FIELD OF THE INVENTION

This invention relates to a voltage regulated DC-output circuit, having dual or multiple balanced voltages with respect to a zero-voltage level. In particular, this invention provides a compact DC-output voltage system with few operating components, having very close regulation as to the output voltage, regardless of load imbalance, and having a single voltage sensing circuit in the output regardless of the number of output voltages provided from the circuit.

BACKGROUND OF THE INVENTION

Regulated DC-output circuits are well known, for use particularly with ordinary commercial alternating current inputs, usually at 60 Hz. However, particularly when such DC-output circuits are providing regulated DC to loads such as remote operating computers and ground stations for satellite tracking systems, and the like, the load on the circuits may vary from time to time, and also the load may be imbalanced. Moreover, it is sometimes desirable that there should be provided a plurality of DC voltages, positive and negative with respect to zero, from a single DC-output circuit device.

Still further, especially when such DC-output circuit devices are remotely located, it is sometimes desirable that they should operate with other than ordinary 60 Hz. inputs. For example, some DC-output circuit devices may be required to operate with 400 Hz. inputs, or even much higher frequency inputs such as 20 to 50 KHz.

Voltage sensing in DC-output circuits is well established, and in circuits according to the present invention the voltage sensing may be similar to the manner of voltage sensing that is taught in other patents issued to the same inventor herein, particularly Canadian Pat. No. 822,798, issued Sept. 9, 1969; Canadian Pat. No. 1,038,033 issued Sept. 5, 1978; or Canadian Pat. No. 1,073,975, issued Mar. 18, 1980. The manner of voltage sensing and the relationship of the voltage sensing to an input power regulating circuit having a saturable reactor or magnetic amplifier or SCR operated devices, are also referred to in those patents.

What the present invention is particularly directed to is the provision of highly regulated DC-output voltage systems having only a single voltage sensing and feedback loop control and regulating circuit, regardless of the number of pairs of balanced DC voltage outputs—with respect to zero-voltage—that may be provided.

Moreover, the present invention is directed to such circuits where the input power may come from relatively high frequency supplies, where in order to preclude unnecessary noise in the output it may be desirable that the circuits should act as switch-mode regulated supplies, with high frequency input.

Still further, circuits according to the present invention may be provided where the input to the circuits may be three-phase or multi-phase, with plural outputs.

The present invention is accomplished by the provision of a regulated direct current output circuit having an alternating current input, with a power regulating means and an output voltage sensing means, where the voltage sensing means is connected in the output of the circuit and controls the operation of the power regulating means, and where the power regulating means controls the power throughput of a transformer which has at least a bifilar wound secondary winding with a centre-tap and at least a pair of first balanced taps with respect to the centre-tap, one on each side thereof. For each tap, there is provided a pair of oppositely facing diodes, connected on one side of each diode to one of the balanced taps and on the other side to the other side of the diode from the other pair of diodes connected to the other tap which has the same polarity. The connected, equal-polarity sides of the pairs of diodes face the output of the circuit. A pair of polarized capacitors is connected to the pairs of output terminals and to the centre, zero-voltage terminal, in positive facing fashion so that the zero-voltage terminal is positive to the negative voltage terminal and negative to the positive voltage terminal, respectively.

Preferably, the diodes are very low threshold diodes such as Schottky diodes.

The above description of a circuit according to the present invention is one which may be used, particularly when the input to the circuit is high frequency. Alternatively, with suitable capacitor input filters, or pi filters the circuit described above may be used with low frequency inputs.

However, where the input to the circuit is at high frequency, it is normal that the connected, equal-polarity sides of the pairs of diodes are, in turn, each connected to one of a pair of bifilar wound chokes. Those chokes have isolated windings on a common core, and are in series with the respect of ones of the pairs of equal-polarity connected diodes. Of course, the polarity of the chokes is also the same as that of the diodes, so as to assure a balanced DC-output.

The output of multi-voltage circuits according to the present invention is closely regulated, despite the fact that the voltage sensing circuit is connected across only a single pair of DC voltage output terminals, with very little loss of regulation, due to the fact that the entire operating circuits are based on the presence of bifilar wound, closely coupled chokes and a bifilar wound secondary winding of the circuit throughput transformer.

Circuits according to the present invention are particularly well adapted, because of their close coupling and well regulated operation, for slaving with similar circuits, without undue amounts of additional control circuitry.

BRIEF DESCRIPTION OF THE DRAWINGS

The above features and advantages of the present invention are more fully discussed hereafter, in association with the accompanying drawings, in which.

DESCRIPTION OF THE PREFERRED EMBODIMENTS:

As previously noted, the present invention provides a regulated direct current output circuit with an alternating current input and regulated DC-output. The circuits described hereafter are schematic, showing the principal operating components according to the present invention, and referring by function to other components which form no specific part of the present invention and which are more fully described in the aforementioned patents in the same name as the present inventor.

Figure 1:
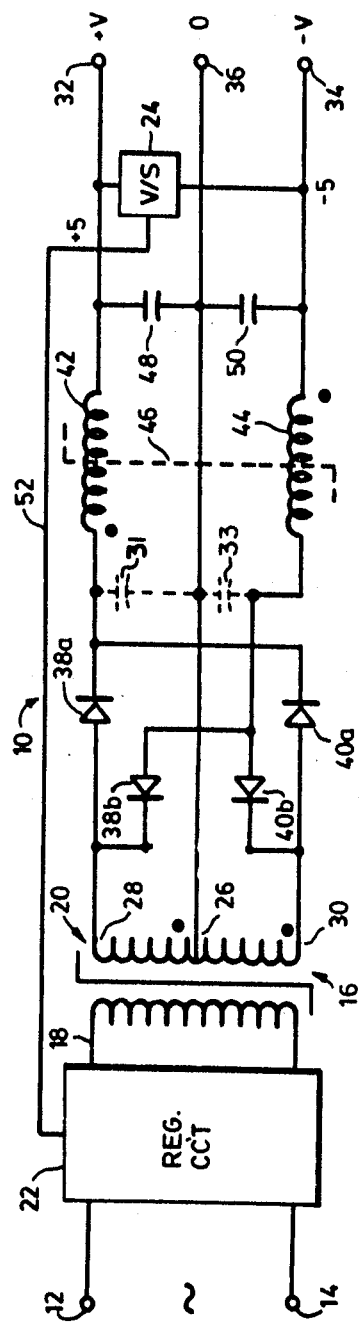
FIG. 1 is a schematic circuit showing a simple, balanced DC-output circuit with single positive and negative voltages.

The circuit of FIG. 1 is a simple, balanced DC-output circuit 10, which has an AC-input at terminals 12 and 14. The control of the alternating current input, and therefore of the power throughput through a transformer 16 having a primary winding 18 and secondary winding 20, is by way of a power regulating circuit 22. The power regulating circuit 22 may comprise a saturable reactor or magnetic amplifier, an SCR operating circuit, or a pulse-width modulated transformer. All of those circuits are, of course, under the control of a control coil, whose operation is in turn directed and under the control of voltage sensing circuits 24 in the output of the regulated DC-output circuit of the present invention.

At least the secondary winding 20 of transformer 16 is bifilar wound. The secondary winding 20 has a centre-tap 26, and in the case of the circuit of FIG. 1, a single pair of end taps 28 and 30. The bifilar winding of the secondary 20 of transformer 16 is such that the polarity of the halves of the winding with respect to centre-tap 26 is as shown; i.e., the centre-tap and tap 30 have identical polarities with respect to their respective halves of the secondary winding.

Preferably, of course, the taps 28 and 30 are balanced with respect to the centre-tap 26, thus giving a balanced DC voltage output at terminals 32 and 34 with respect to the zero-voltage terminal 36 in the output of the circuit 10. (Of course, it is also possible in certain special circumstances that the circuit 10 can be provided so that the tap 26 is moved from the centre point of the bifilar wound secondary winding 20; but in that case there would be a portion of the secondary winding which would no longer be bifilar wound.)

Connected to each of the end taps 28 and 30 is a pair of oppositely facing diodes. Thus, there is a pair of diodes 38a and 38b connected with their cathode and anode, respectively, to end tap 28; and a pair of diodes 40a and 40b connected with their cathode and anode terminals, respectively, to end tap 30.

The opposite sides of each of the pairs of like-polarity diodes are connected one to the other. Thus, the anode sides of diodes 38a and 40a are connected together; and the cathode sides of diodes 38b and 40b are connected together.

In a low frequency circuit, the connected anode sides of diodes 38a and 40a and cathode sides of diodes 38b and 40b may be connected directly to the output terminals 32 and 34, respectively. Capacitors 31 and 33, may be connected in the circuit as shown in dotted lines in FIG. 1.

The more common configuration of the circuit of FIG. 1, according to the present invention, however, is as illustrated in FIG. 1, where the connected common point of the diodes 38a and 40a, remote from the respective taps 28 and 30, is connected to a choke 42 which is in series with the positive terminal voltage 32. Likewise, the common point of diodes 38b and 40b is connected to a choke 44 which is in series with negative DC voltage terminal 34 in the output of circuit 10.

Chokes 42 and 44 are, themselves, bifilar wound, on a common core, as indicated by dashed line 46. Also, the polarity of the chokes 42 and 44 with respect to the centre-tap 26 of secondary winding 20 is such that when the centre-tap is positive, the end of choke 42 which faces the connected anodes diodes 38a and 40a is also positive. Likewise, the polarity of choke 44 is in the opposite direction, with respect to the output terminals of the circuit 10.

There are a pair of polarized capacitors 48 and 50 connected in the output of the circuit 10, in opposite facing relationship with respect to the centre-tap 26 and the zero-voltage terminal 36, each to the sides of the chokes 42 and 44 which are remote from the respective taps 28 and 30.

In operation, the voltage output of the circuit 10 is sensed at terminals 32 and 34, giving a sensing voltage +S to −S. The output of the voltage sensing circuit 24—the control voltage—is fed back to the power regulating circuit 22 through a feedback loop 52, so as to thereby control the throughput power of transformer 16. As mentioned, the throughput power of the transformer 16 is controlled by a saturable reactor or magnetic amplifier, SCR circuitry or a pulse-width modulated transformer, within the power regulating circuit 22 under control of the control voltage in the feedback loop 52 from the voltage sensing circuit 24.

In order that there should be close regulation, the chokes 42 and 44 should not only be bifilar wound on the same core, they should be closely coupled or well coupled, with respect to the operating characteristic of each other.

Likewise, each of the diodes 38a and 38b, and 40a and 40b, should be a low-threshold voltage diode. Such a diode, having a low threshold voltage, operates in such a manner that its characteristic from being completely conductive to completely non-conductive is over a very narrow voltage threshold. Preferably, such diodes are Schottky diodes, having high power handling and very low power dissipating rates.

Figure 2:
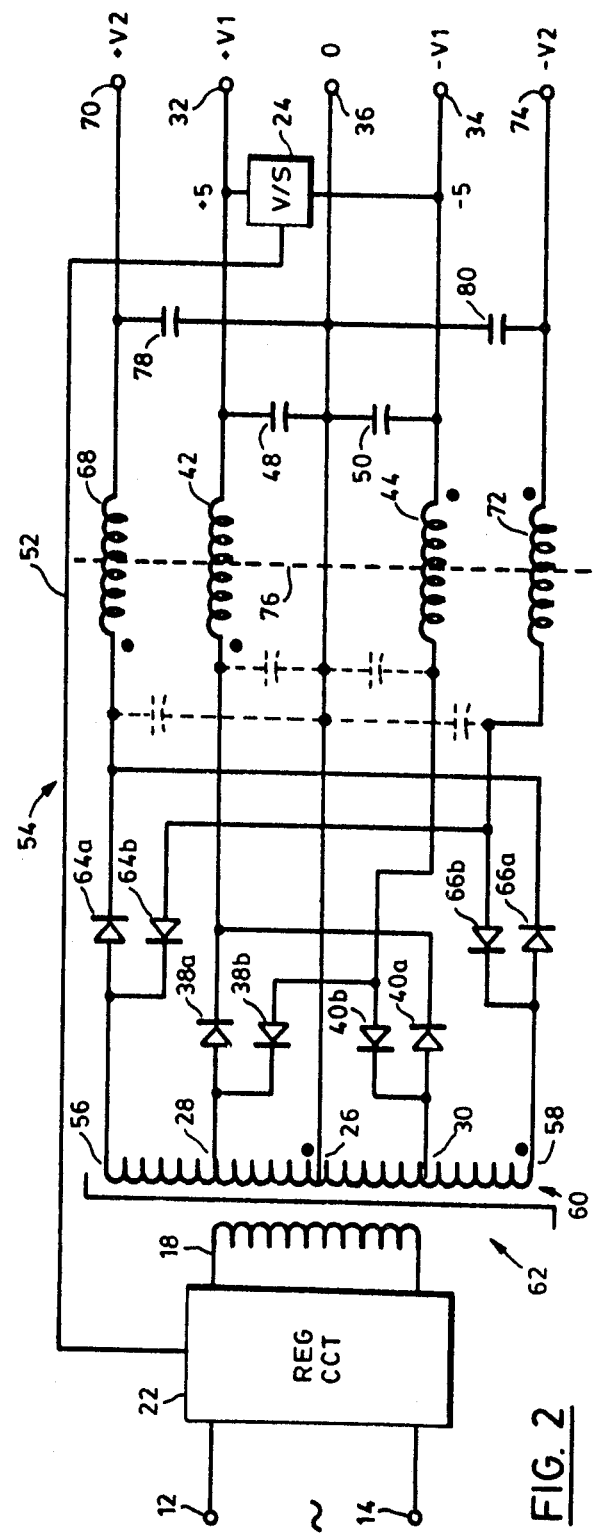
FIG. 2 is a circuit similar to FIG. 1 but having multiple output voltage levels.

Turning to FIG. 2, a variation of the circuit of FIG. 1 is shown, where in this circuit 54, there are provided not only the same components as discussed above with respect to FIG. 1 which are therefore shown in FIG. 2 with the same reference numerals, there are additional components because of the additional pair of balanced taps 56 and 58 on the bifilar wound secondary winding 60 of the transformer 62. In this case, taps 56 and 58 are outside taps 28 and 30, with respect to the centre tap 26. Also, the polarities of the half windings of secondary winding 60, from tap 56 to centre-tap 26 and from centre-tap 26 to tap 58, are the same as indicated with respect to the polarity of the half windings of bifilar wound secondary 20 in FIG. 1.

Connected to tap 56 is a pair of diodes 64a and 64b, and connected to tap 58 is a pair of diodes 66a and 66b. Each of those pairs of diodes is connected in the same manner as the diode pairs 38a,38b and 40a, 40b to their respective taps 28 and 30; and the common point of diodes 64a and 66a is connected to a choke 68 to output terminal 70, while the common point of diodes 64b and 66b is connected through a choke 72 to output terminal 74.

In the usual case where the chokes 68 and 72 are present, together with chokes 42 and 44, they are bifilar wound, on a common core with chokes 42 and 44, as indicated by dashed line 76. Moreover, the choke 68 has the same polarity with respect to the output of circuit 54 as choke 42; and likewise the choke 72 has the same polarity with respect to the output of circuit 54 as choke 44.

A further pair of polarized capacitors 78 and 80 are connected with respect to the output terminal 36 from output terminal 70 and 74, in the same polarity as polarized capacitors 48 and 50 are connected.

However, it will be noted in the circuit 54 of FIG. 2 that there is only a single voltage sensing circuit 24, connected between terminals 32 and 34 as in FIG. 1, and that there is no additional voltage sensing circuit between the terminals 70 and 74. Such additional voltage sensing is not required, even if there is an imbalance of load at the individual output terminals of the circuit 54; and the amount of regulation of the voltage output terminal 70 and 74 is, characteristicly, less than 0.5% higher than the regulation at output terminals 32 and 34. These advantages come because of the closely coupled nature of all of the bifilar wound chokes on a single core, as well as the bifilar wound secondary winding.

Of course, there may be additional pairs of balanced taps beyond taps 56 and 58, but the operating functions of a circuit having such additional balanced taps would be the same as that of circuits 10 and 54 of FIGS. 1 and 2, respectively. Only a single voltage sensing circuit 24 and a single feedback loop 52 would be provided, in any event.

Figure 3:
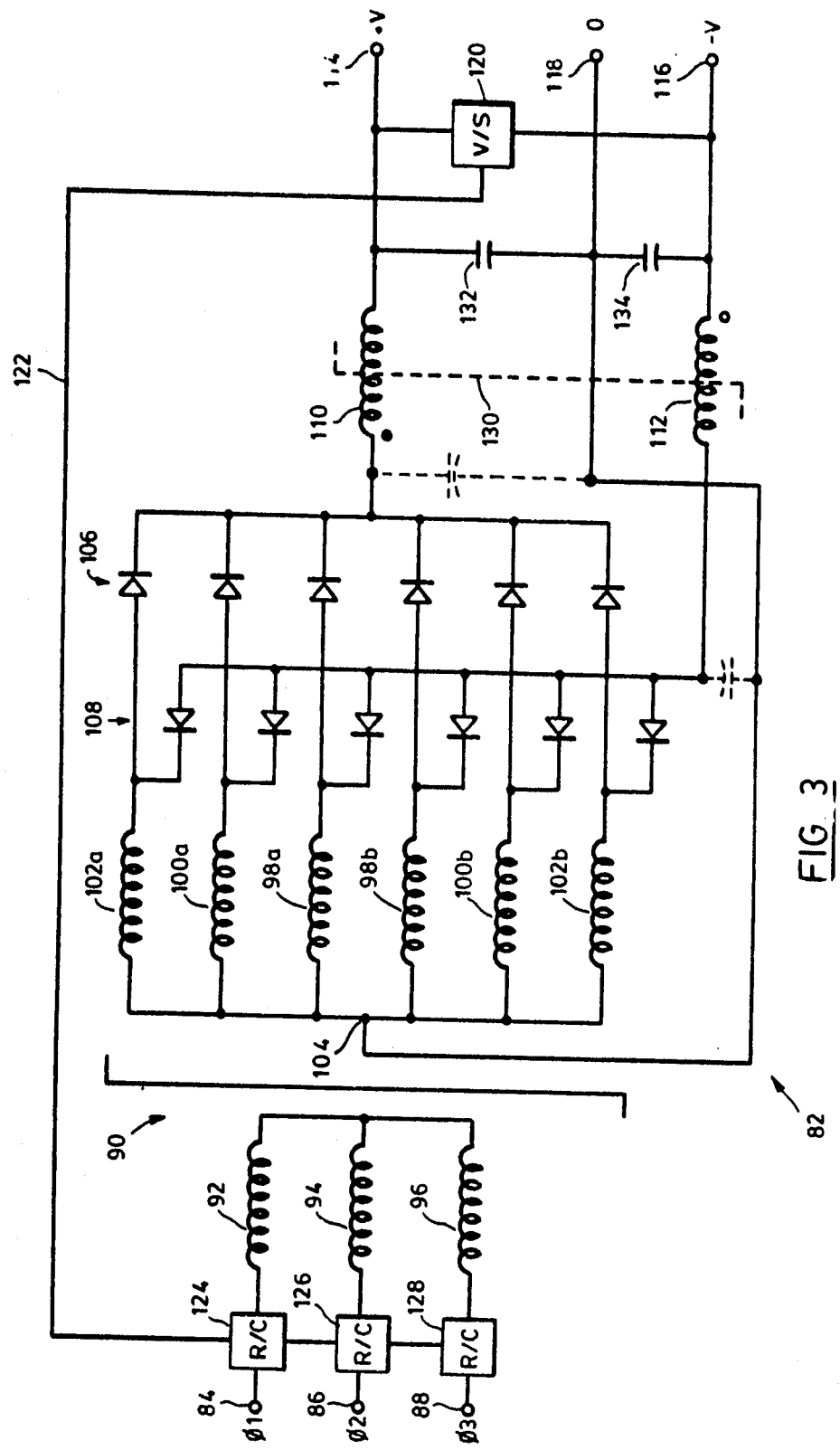
FIG. 3 is a circuit similar to FIG. 1 but having three phase alternating current input.

Turning now to FIG. 3, there is shown a circuit 82 similar in concept to circuits 10 and 54 of FIGS. 1 and 2, respectively. However, circuit 82 comprises a three-phase input as shown at 84, 86, 88; so that transformer 90 has three primary windings 92, 94 and 96, and multiple secondary windings, each in pairs 98a and 98b, 100a and 100b, and 102a and 102b, all of which are connected to a common point 104 which functions as a centre-tap for each of the pairs. Of course, all of the secondary windings are bifilar wound.

To each of the half-secondary windings of transformer 90 there are, once again, pairs of oppositely facing diodes—designated as diode groups 106 and 108. All of the anodes of the diode group 106 are connected to a common point which connects to the inner end of choke 110. The outer end of choke 110 is connected to the output, positive DC voltage terminal 114. Likewise the cathodes of diode group 108 are connected to the inner end of choke 112, the outer end of which is connected to negative DC voltage terminal 116.

Of course, the common secondary point 104 is connected to the zero-voltage terminal 118.

Once again, a voltage sensing circuit 120 is provided, connected between positive and negative DC-voltage terminals 114 and 116; and in this case, the output of the voltage sensing circuit 120 goes through feedback loop 122 to the three-phase power regulating circuit 124, 126, 128.

As before, when used, the chokes 110 and 112 are bifilar wound on a common core, as indicated by dashed line 130. Also, as before, a pair of polarized capacitors 32 and 134 are connected in the output of the circuit 82.

The operation of the circuit 82 is similar to the operation of circuits 10 and 54. The throughput power of transformer 90 is controlled by the power regulating circuit having the three-phase components 124, 126, 128; and the operation of those power regulating circuits 124, 126, 128 is under control of the voltage sensing circuit 120 through feedback loop 122.

Of course, the secondary windings of the transformer 90 may be multiple tapped in each phase, so that each secondary winding would appear as secondary winding 58 of transformer 62 in circuit 54 of FIG. 2, and the output of the circuit would have multiple-level DC voltages with respect to zero-voltage.

Moreover, if necessary, the circuit of FIG. 3 can be multi-phase—i.e., having more than three phases.

In any of the circuits of FIGS. 1, 2 and 3, unbalanced direct current loads may be placed on the circuit—unbalanced as to the positive and negative terminals with respect to zero-voltage terminal—but regulation of the output voltage remains very tight over the circuit rating. Thus, the output voltage at no load or substantially no load conditions may differ from the output voltage at full load conditions, even when unbalanced, by less than 0.5%. In most instances, particularly at high input frequencies, bifilar wound chokes are used. It is possible, when appropriate input filter capacitors, as shown at 31 and 33 in FIG. 1, and likewise as shown in FIGS. 2 and 3 are used at low frequency, that the chokes may be omitted.

As noted, the precise circuit components of the power regulating circuits and voltage sensing circuits are not discussed above, as they are well known in the art, from such sources as the patents referred to above in the name of the present inventor. Similarly, no discussion is made as to the specifics of the bifilar wound secondary windings on any of the transformers, or in respect of any of the chokes used in the circuits, as such techniques are well known.

Finally, it has been indicated that each of the diodes referred to in the above discussion is a low-threshold diode, preferably a Schottky diode, but other diodes having suitable characteristics may be used. Because the circuits are not generally current limited, it is usual that the diodes, chokes and capacitors should be slightly over-dimensioned, with respect to the circuit rating, so as to avoid inadvertent current limiting because of the presence of under-dimensioned components whose operation cannot be predicted and whose non-characteristic operation would adversely affect voltage regulation of the circuits.

Other embodiments and circuit variations, and other specifics as to circuit components, may be utilized without departing from the spirit and scope of the appended claims.

What is claimed is:

1. A regulated direct current output circuit having a low frequency or high frequency alternating current input, a transformer, a common power regulating means on the input side of the transformer, and an output voltage sensing means, said voltage sensing means being connected in the output of said circuit and controlling the operation of said common power regulating means;

said power regulating means being arranged to control the power throughput of the transformer which has at least a bifilar wound secondry winding with a centre-tap and a first pair of balanced taps, said first pair of balanced taps being one on each side of said centre-tap;

a pair of oppositely facing diodes connected on one side of each diode to each of said balanced taps, the other side of each of said pair of diodes being connected to the other side of the one diode of the pair of diodes which is connected to the other of said balanced taps and which has the same polarity of connection; where the connections of said diode pairs opposite said balanced taps are facing the output of said circuit;

and a pair of polarized capacitors connected oppositely facing to said centre-tap, and to the connected sides of said pairs of diodes which are remote from said balanced taps; where all elements in said output of said circuit, including said bifilar wound secondary winding, are closely coupled, thereby to assure close output regulation of all output voltages using a single voltage sensing means.

2. The regulated direct current output circuit of claim 1, where the connected equal-polarity sides of said pairs of diodes that are respectively connected to said balanced taps are each connected to one of a pair of chokes which are in series with the output of said regulated circuit;

said chokes being bifilar wound, isolated windings, on a common core;

the polarity of said chokes with respect to said centre-tap being opposite and such that when said centre-tap is positive, the end of the choke which faces the connected anodes of said pairs of diodes is also positive.

3. The regulated direct current output circuit of claim 2, where said chokes are closely coupled.

4. The regulated direct current output circuit of claim 1, 2 or 3 where said diodes are low-threshold voltage diodes.

5. The regulated direct current output circuit of claim 1, 2 or 3, where said diodes are Schottky diodes.

6. The regulated direct current output circuit of claim 2 or 3 where there are at least two pairs of balanced taps, said first pair of balanced taps being closest to said centre-tap than any other pair of balanced taps;

there being connected pairs of diodes, a pair of chokes, and a pair of capacitors for each additional pair of balanced taps, all connected as said diodes, chokes and capacitors are connected, but to their respective balanced taps;

and said voltage sensing means is connected between output terminals which derive output voltage from said first pair of balanced taps.

7. The regulated direct current output circuit of claim 1, 2 or 3, where said transformer has multi-phase primary and secondary windings; and said secondary windings comprising pairs of windings connected to two sets of pairs of oppositely facing diodes, the sides of said pairs of diodes away from said windings being connected to a pair of output terminals for said circuit;

said voltage sensing means being connected across said output terminals.

8. The regulated direct current output circuit of claim 1 where the low frequency input may be in the order of 50 to 400 Hz, or the high frequency input may be in the order of 20 to 50 KHz.

* * * * *